Oct. 14, 1941.  R. F. WOOD ET AL  2,258,964
RAIL SECURING MEANS
Filed June 25, 1940
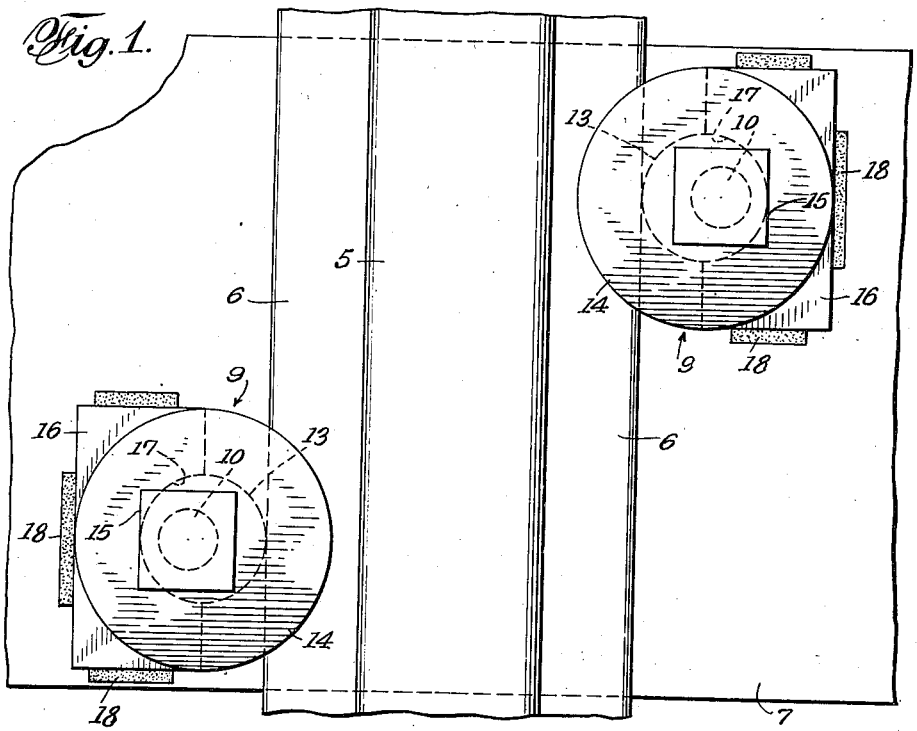
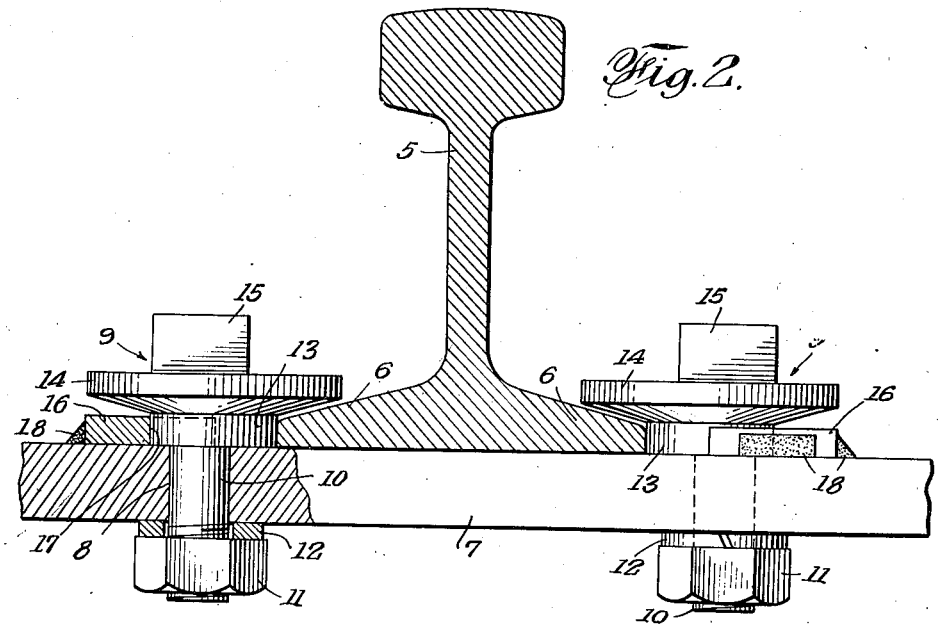
INVENTORS
ROBERT F. WOOD
ROBERT SEEMAN
BY
ATTORNEY Patented Oct. 14, 1941

2,258,964

UNITED STATES PATENT OFFICE 2,258,964

RAIL SECURING MEANS

Robert F. Wood, Glenside, and Robert Seeman, Willow Grove, Pa.

Application June 25, 1940, Serial No. 342,192

4 Claims. (Cl. 238—341)

The present invention relates to rail securing means and more particularly to clip fasteners.

The general object of the invention is to provide rail securing means which are safe and will securely hold the rails in position against forces tending to displace them.

Another object of the invention is to provide rail securing means which may be adjusted to properly grip the rail and then locked in adjusted position against loosening.

A further object is to provide rail securing means which are locked against displacement, which, however, are readily removable as desired, and which can be replaced only in their original rail securing position.

The foregoing objects and other objects, features and advantages of the invention will become more clearly apparent or will be pointed out in the following detailed specification in which is described an at present preferred embodiment of the invention. In the drawing, forming the basis for the specification:

Fig. 1 is a top plan view of a fragment of a rail secured by fasteners such as contemplated herein.

Fig. 2 is an end view thereof, partly in cross-section.

In that embodiment of the invention which is illustrated, the rail 5 is provided with the usual flanges 6 and is set upon a beam or plate 7 which in this instance is preferably of metal.

As contemplated, the plate 7 is provided with at least one hole 8 on each side of the rail flanges and somewhat spaced therefrom as shown.

In each hole 8 is fitted a clip bolt, generally designed 9, the shank 10 of each clip bolt passing through the respective hole 8 and fitted with a nut 11 and lock washer 12. Said nut and washer are preferably disposed on the under side of the plate 7, the clip bolt being locked thereby and against the shoulder formed by the eccentric circular portion 13 disposed on the top side of said plate 7. In the present instance a larger eccentric circular portion 14 is formed on the clip bolt, and the bolt completed by providing a tool engaging portion such as the square projection 15.

The clip bolt which is illustrated is of integral form. It is evident, however, that the clip comprising the portion 13 may be separately made and fastened to the bolt 10 as desired.

It is readily evident that the rail 5 may be adjusted to any desired position by merely rotating the clip bolts 9 by means of a suitable tool engaged with the square projection, the clip portions 13, because of their eccentricity, acting as cams for urging the rail in either lateral direction. One of the clip bolts may be used for adjusting the rail position and the other then applied to lock the rail against itself and against the other clip bolt. It may be seen, from the structure employed, that the holes 8 need not be accurately placed, since any such inaccuracies are taken up in the final rotational positioning of the clip bolts.

After each clip bolt is finally positioned, a lock plate 16 is placed with its half round notch 17 against the clip 13, and the lock plate welded as at 18 to the plate 7. The radii of the clip 13 and the notch 17 are equal or substantially so. Hence, the clip bolt is locked against loosening rotation which seeks to occur about the axis of the bolt 10.

While the clip bolts are effectively and securely locked against displacement as by the means above described, they may be easily removed should it become necessary. This may be accomplished by removing the nuts 11 and tapping the ends of the shanks 10 upwardly. When the bolts are to be replaced, they can only fit rotationally in their initial position. Hence, they can only be replaced correctly.

If, for any reason, replacement of the clip bolts becomes necessary, the lock plates 16 may be removed by chipping away the welds. The securing means may then be replaced as above described.

While transverse movement of the rail is limited by the clip bolts, limited vertical movement of the rail is permitted by the eccentric portion 14 which is spaced from the flange of the rail a predetermined amount for this purpose.

It will be noted that the lock plate serves to reinforce the plate 7 at the holes 8, and affords additional thickness or shoulder for the bearing portion of the bolt.

It can be seen from the foregoing that simple and effective rail securing means have been provided. It is also evident that the invention may be modified within the spirit and scope of the appended claims. It is not intended, therefore, that said invention be limited by the terms used herein or by the specific details of this disclosure.

We claim:

1. Rail securing means comprising a rail support, a rotatable cam member mounted on the support and constructed to apply a variable lateral pressure against the rail base, and a locking member secured to the rail support beside the cam member and after the cam member is in adjusted position and bearing thereagainst, said rotatable cam member and locking member having abutting cam faces arranged relative to the rotatable member to prevent turning movement thereof.

2. Rail securing means comprising a rail support, a cam member having a cam edge constructed to apply a variable lateral pressure against the rail base, said cam member having a peripheral locking surface thereon approximately opposite from the cam edge, means for journaling the cam member on the rail support for turning movement about an axis, and a locking member secured to the rail support after the cam member is in adjusted position and having an abutting face bearing against the locking surface of the cam member, said abutting face and locking surface being arranged relative to the cam member to prevent turning movement thereof.

3. Rail securing means comprising a rail support, a cam member having a cam edge constructed to apply a variable lateral pressure against the rail base, said cam member having a peripheral locking surface thereon approximately opposite from the cam edge, means for journaling the cam member on the rail support for turning movement about an axis, and a locking member secured to the rail support after the cam member is in adjusted position and having an abutting face bearing against the locking surface of the cam member, said abutting face and locking surface being arranged on an arc eccentric of the axis of turning movement of the cam member and preventing turning movement thereof.

4. Rail securing means comprising a rail support, a rotatable eccentric member mounted on the support and constructed to apply a variable lateral pressure against the rail base, and a locking plate secured to the rail support after the eccentric member is in adjusted position and having a concave portion bearing against the periphery of the eccentric member, said locking plate having the concave portion thereof approximately concentric of the eccentric member and preventing relative rotation thereof.

ROBERT F. WOOD.
ROBERT SEEMAN.